US008090525B2

(12) United States Patent
Villiers

(10) Patent No.: US 8,090,525 B2
(45) Date of Patent: Jan. 3, 2012

(54) DEVICE AND METHOD FOR PROVIDING AUTOMATIC ASSISTANCE TO AIR TRAFFIC CONTROLLERS

(76) Inventor: Jacques Villiers, Paris (FR)

( * ) Notice: Subject to any disclaimer, the term of this patent is extended or adjusted under 35 U.S.C. 154(b) by 1097 days.

(21) Appl. No.: 10/556,559

(22) PCT Filed: May 14, 2004

(86) PCT No.: PCT/FR2004/001201

§ 371 (c)(1),
(2), (4) Date: Nov. 14, 2005

(87) PCT Pub. No.: WO2004/102505

PCT Pub. Date: Nov. 25, 2004

(65) Prior Publication Data

US 2007/0032940 A1 Feb. 8, 2007

(30) Foreign Application Priority Data

May 14, 2003 (FR) ...................................... 03 05795
Nov. 12, 2003 (FR) ...................................... 03 13260

(51) Int. Cl.
*G06F 19/00* (2011.01)

(52) U.S. Cl. .................. 701/120; 701/1; 701/4; 701/13; 701/29; 342/29; 342/30; 342/33; 342/455

(58) Field of Classification Search .................. 701/120; 455/431; 342/29, 259
See application file for complete search history.

(56) References Cited

U.S. PATENT DOCUMENTS

| | | | | |
|---|---|---|---|---|
| 4,839,658 A | | 6/1989 | Kathol et al. | |
| 5,043,903 A | * | 8/1991 | Constant | 701/300 |
| 5,212,804 A | * | 5/1993 | Choate | 455/431 |
| 5,961,568 A | * | 10/1999 | Farahat | 701/120 |
| 6,134,502 A | * | 10/2000 | Sarangapani | 701/301 |
| 6,314,362 B1 | * | 11/2001 | Erzberger et al. | 701/120 |
| 6,420,993 B1 | | 7/2002 | Varon | |
| 6,604,044 B1 | * | 8/2003 | Kirk | 701/120 |
| 7,248,949 B2 | * | 7/2007 | Love et al. | 701/4 |
| 2002/0011950 A1 | * | 1/2002 | Frazier et al. | 342/357.08 |
| 2007/0032940 A1 | * | 2/2007 | Villiers | 701/120 |

FOREIGN PATENT DOCUMENTS

JP 11203600 7/1999

OTHER PUBLICATIONS

Nicolas Durand et al., "*Optimal Resoluton of En Route Conflicts*", AGARD Report 825, Air Traffic Management: Support for Decision Making Optimisation—Automation, Conference proceedings of the Mission Systems Panel Workshop on ATM held in Budapest. Hungary, May 27-29, 1997.
Heinz Erzberger et al., "*Concept for Next Generation Air Traffic Control System*", Air Traffic Control Quarterly, Air Traffic Control Association, US, vol. 10, No. 4, Jan. 1, 2002.
Douglas R. Isaacson et al., "*Design of a Conflict Detection Algorithm for the Center/TRACON Automation System*", Digital Avionics Systems Conference, 1997, 16TH DASC., AIAA/IEEE Irvine, CA, USA, Oct. 26-30, 1997.

* cited by examiner

*Primary Examiner* — Hussein Elchanti
*Assistant Examiner* — Redhwan k Mawari
(74) *Attorney, Agent, or Firm* — Greer, Burns & Crain, Ltd.

(57) ABSTRACT

A method and a system for assisting air traffic controllers that automatically detects conflicts between aircraft trajectories and selects the conflicts that can be solved by minor modification(s) of aircraft speed, climbing rates or descending rates and lateral shifts of route. Minor modifications are selected so as to not interfere with current controllers' decision making process thereby circumventing the basic rule of uniqueness of control in a given piece of airspace. The minor modifications are automatically transmitted to aircraft for execution without requiring controllers' prior agreement. Thus, the method solves most conflicts, such that the air traffic delivered to the controllers is free of most of the pre-existing conflicts.

19 Claims, 4 Drawing Sheets

DEVICE AND METHOD FOR PROVIDING AUTOMATIC ASSISTANCE TO AIR TRAFFIC CONTROLLERS

BACKGROUND

The present invention concerns a friendly and evolutionary device for assisting air traffic controllers and able to evolve towards a fully automated system. It concerns also a process made use in this device.

The air traffic systems function is to prevent collisions and insure a safe and efficient air traffic flow. Presently, the decisions and the responsibility of safety rely exclusively on the air traffic controllers.

Each team controls a predetermined part of the airspace, called control sector. This team is composed of a Radar controller and an assistant more specifically in charge of strategy and coordination with the adjacent sectors.

The role of the computers is presently limited to acquire, correlate, elaborate and automatically display to the controllers, in appropriated format and time, the data concerning the present positions (Radar) and the flight intends (flight plan) of each individual aircraft.

The computers do not compute systematically the relative positions of the pairs of aircraft and, a fortiori, their collision probability, excepting for provoking an ultimate alarm in case of an imminent collision danger (safety net).

The perceptive, cognitive and mnemonic capabilities of the controllers are limiting the quantity and accuracy of the data that, in real time, they can effectively acquire, remember and submit to mental computation, namely for assessing the relative present and future relative positions of the aircraft as taken two by two.

Taking in account the fuzziness in which they operate, the controllers are forced to take important margins in they evaluations; therefore they retain numerous pairs of aircraft <<problems>> and proceed to a permanent survey of the evolution of the situation, which requires time and attention, for insuring as time elapses, that they doesn't turn into effective <<conflicts>> requiring a collision avoidance action. They are led to consider permanently the overall traffic as a whole; therefore, they elaborate an overall strategy and a tactics progressively adapted to the evolution of the situation and to they workload.

The saturation in the capacity of the system therefore results from the partial use of fuzzy data leading to an imperfect use of the available airspace and to a real-time overloading of the controllers.

A computer, supposed to be programmed for making full use of all the available data and of its computing capabilities for achieving the task presently devoted to the controllers, would not encounter such limitations. It would build a strategy, a tactic and decisions radically different from those of the controllers. This disparity of perception and appraisal of the situation and of its evolution would conduct to an irreducible source of incommunicability and misunderstanding between the controllers and a so programmed computer. In the same way, the controllers would not have the necessary time available for interrogating step by step such a computer for enriching or refining their appreciation of the present situation and of its evolution, for testing a solution or for having some optimizing computations made at their request.

Lastly, in the present state of the art and of the techniques, such a computer ignoring the cognitive thought process and the intentions of the controllers would not be in a position for assisting them in the appropriate form and moment, and would, on the contrary, take the risk to perturb in an inappropriate way the course of their thinking. A proposal for a given action made at a given moment by the computer would have no probability to fit harmoniously the strategy as elaborated by the concerned controller, the said strategy being ignored by the computer; such proposals would be considered as non-understandable or ill-advised.

For these reasons, and in the present state of the techniques, there exists no device permitting to a computer to assist the controllers in real time for elaborating their decisions, the said controllers staying the only masters of organizing their task, of elaborating their strategy and the only judge and responsible of their decisions and of safety.

For obvious reasons, the decisions and the responsibility in a given airspace can only be unique and cannot be shared between a controller and a computer without leading to dangerous situations.

For all these reasons, all the attempts for introducing a computer in the controllers' decision processes have led to a failure or to disappointing results. Inversely, it is not conceivable to include a controller into an automatic loop, the finality and the process of which would escape to their understanding.

Thus, the system, as it presently exists, has not significantly been improved since many years; it therefore cannot benefit neither of all the quantity and accuracy of the available data, nor of the computing capabilities of the computers for forecasting, survey and resolution of the potential conflicts of the aircraft as taken two by two. The situation is thus blocked despite the fact that the system operates with powerful computers for performing the limited functions which they can presently be devoted.

For overcoming the above obstacles which are opposing the communicability between a controller and a computer for exercising the controlling functions, it could be envisaged to directly proceed to a complete automation of the system. In theory, such a radical venture could be envisaged since it is becoming possible to equip the aircraft with navigational and command computers and with automatic air/ground and air/air communication links. In theory, it could even be envisaged to give up the centralized ground control for delegating this function to the network of the airborne computers communicating two by two. A third way, sometimes suggested, is to render the system deterministic, and therefore able to be planned, by taking full benefit of the aircraft's navigation accuracy and flexibility under computer control.

All these potentialities are however staying at the state of theoretical debates. Actually, the effective implementation of such automated systems would have to face at least two insurmountable obstacles: on the one hand, all the aircraft would have to be simultaneously specifically equipped on D Day and, on the other hand, the overall system of such an extreme complexity would have to be beforehand tested and certified in a real environment in facing all the hazards they could encounter.

Faced to the unrealism of a complete automation or to the possibility of a cooperation between computers and controllers, it results from the present state of the techniques that, not only a partial benefit can only be made of all the presently available data and means, but also the new means able to provide radically enriched data (precise satellite navigation, on board computers, air/ground and air/air automatic datalinks) are staying unusable for improving air traffic control, even if some aircraft are already so equipped and if some more could be equipped if this could effectively be beneficial to air traffic control.

Taking account of the saturation of the air traffic control system and of the costs of the resulting delays, the airlines would be willing to make the effort of equipping their fleet, if they were convinced that the system could be accordingly and immediately improved.

SUMMARY OF THE INVENTION

The aim of the present invention is to overcome all the deadlocks inherent to the present state of the art and to open a new field for permitting the system to evolve, without imposing the prior equipment of the aircraft, and then to render it increasingly efficient as the equipped aircraft will become more numerous and for contributing accordingly to the safety and to the efficiency of the system.

This objective is reached with an evolutionary device providing an automated assistance to the air traffic control, provided for complementing a conventional air traffic control system comprising a computer including a software program permitting to receive the aircraft flight plans data and Radars data and to elaborate and display them to the controllers of each control sector, the said controllers being provided with a radiotelephony link for communicating with the aircraft.

Some arrangements of the invention further require this system to be complemented by an already experimented additional program provided for permitting the controllers to elaborate and display a complementary list, said the "Controller's Agenda", of the problems as the said controllers can forecast them according with the sole data available to them and with their own analysing means.

According to the invention, this automatic assistance device comprises:

- means for establishing and updating a list of conflicts, said the "Computer's Agenda" on the basis of all the means of information and computation available to the computer,
- means for comparing, aircraft pair by aircraft pair, the Controller's Agenda and the Computer's Agenda, provided for making appearing each forecast disparity between the said Agendas,
- means for selecting those of the problems retained by the controller which only take their source to the lack of accuracy of the forecast made by the controller,
- means for selecting among these aircraft pairs the conflicts which can be solved by a modification of the flight parameters (namely speed or climbing or descending rates of one or the two concerned aircraft, time of the beginning of the descent, lateral shift of their route . . . ), the said modification staying within the limits of the normal tolerances of the adherence to their flight plan, and
- means for exchanging messages between the computer and the controllers, namely by the mean of displays.

The device of the invention can advantageously comprise means for elaborating optimal solutions to the conflicts as listed in the Computer's Agenda.

Techniques already exist for elaborating such optimal solutions, the example of which are quoted as described in the document "Optimal resolution of en route conflicts" by G. Granger, N.Durand and J. M. Alliot, $4^{th}$ Air traffic management Rand Seminar 2001.

The device of the invention draw advantageously advantage of the new equipments as specified by the International Civil Aviation Organisation (ICAO) (data links) as progressively the aircraft will be equipped with. At this effect, it can furthermore comprise:

- means for establishing a data link with the aircraft's on board computers,
- means for automatically collecting in the on board computers complementary data for establishing the list of the Computer's Agenda, and
- means for elaborating and implementing instructions for aircraft collision avoidance, for having them been executed and for surveying their execution by the mean of an automatic data link with the on board computers.

The device according to the invention strictly respects the whole controller's responsibility and decision making processes and preserve the total autonomy of their strategic and tactical choices, as well as the organisation of their tasks. It imposes to them no non-voluntary intervention or manipulation susceptible to disturb their cognitive and mnemonic activity.

This device has been conceived on the basis of a deep knowledge of the nature and of the specificity of the controller's tasks and aims at allowing them to benefit of all present and future data and computing means available on the ground or on board of the aircraft.

It provides the controllers with a set of services and tools which they can make use of, at their guise, if and when they wish so; it can also receive from them responsibility delegations.

This device will already find its efficiency in the present state of the equipment of the aircraft and will benefit from any new equipment, accommodating itself with their disparity and duality.

The invention will be better understood after having gone in more depth in what is called a "conflict" between two aircraft, i.e. the recognition, at a given moment, of a potential risk of occurrence of collision.

This is not a "yes or no" forecast, as so often considered, but a contingent estimation which depends on the quality of the available data (positions and speeds) concerning the two implied aircraft and on the available computation means. For example, in the horizontal plan, an even weak inaccuracy in the knowledge of the aircraft ground speeds, say 15 minutes in advance, can transform a "conflict" declaration' into a "non conflict" one and inversely (the speed of each aircraft is of the order of 800 km/h and the minimal separations to be insured when the aircraft are crossing is of the order of 8 KM).

The estimation "conflict" or "no conflict" is also an evolutionary declaration when and as the moment of the potential collision is approaching: the further is this moment, the more fuzzy is the estimation. On the other hand, the further is this moment, the more some limited correcting actions on speeds can be efficient.

The controller can only roughly appreciate the ground speed of the aircraft, or their rate of climb or descent, on the radar screen, and can make only mental approximate extrapolation computations. It is the same in the vertical plane.

It results that the controllers are forced to take large margins of appreciation and retain therefore numerous "problems", many of which not leading to effective conflicts ("false conflicts"), and therefore to memorize each of them and constantly survey the evolution of the overall situation, which is the source of heavy task and attention which contributes very significantly to their stress and to the saturation of their mental capacity.

Moreover, not being able to determine with accuracy how to control the horizontal or vertical speeds of the aircraft, they cannot take the optimal benefit of the nominal airspace capacity at the crossing of the trajectories.

For alleviating these obstacles and taking full advantage of the available capabilities of the automatic data processing, the friendly and evolutionary device for automatic assistance to air traffic controllers, object of the present invention, provides the hereunder described functions.

It provides a set of new functions to the conventional air traffic control system as classically operated in the main present Air Traffic Control Centres. Such a control system comprises a computer programmed as to receive the aircraft flight plans and the Radar data, to elaborate, correlate and display them to the controllers and assistant controllers of each control sector who are provided with a radiotelephony link for communicating with the aircraft.

This system can advantageously be complemented with an already experimented system which assists the controllers for elaborating and displaying on a complementary screen a list, called the "Controllers' Agenda", of the problems as the said controllers can predict them with the sole data and means they have access to. For example of such a device, one can refer to the system named "ERATO" and namely to the document "Mode d'emploi ERATO" by S. Abdesslem and C.Capsie, CENA Version 1, 1$^{st}$ of May 2000.

Any display of the problems as recognized by the controllers will be called hereunder "Controllers' Agenda" whatever are the means for establishing and displaying it on the screens.

The first merit of this arrangement is that the controllers are provided with a time ordered display of the problems according to their time of eventual occurrence, this display providing the materialized reflect of the "operational memory" of the controller which is therefore relieved, and being a particularly efficient tool for easing the coordination within the controller team.

The device according to the invention takes all the advantage of the fact, up to now unexploited, that the "Controller's Agenda" will be a precious source for the computer knowing the representation of the situation as seen by the controllers, taking account of the fuzziness inherent to their forecasting. It also takes advantage of the fact that the conflicts as displayed on the "Controller's Agenda" are time ordered, and that their order, unlike the order of the conventional board (called "strips board") which concern each individual aircraft, has not to be manipulated by the controllers without the computer being informed. Due to this fact, the bilateral exchanges between the computers and the controllers can take as a basis the display or the designation of the line concerning the considered problem or one of the implied aircraft.

In another version of the invention, the "Computer's Agenda", as above described, is directly displayed to the controllers and directly plays the role of a "Controller's Agenda".

The device according to the invention namely allows to realize all or parts of the following functions:

- establishment and memorized updating of a second list of conflicts, said the "Computer's Agenda" on the basis of all the information and computing means of the computer, this list including all the conflicts even before the aircraft are entering in the sector in which the conflict could occur,
- comparison, pair of aircraft by pair of aircraft, of the "Controller's Agenda" and the "Computer's Agenda" and making appearing any forecast disparity between them,
- detection of those of the problems on the "Controller's Agenda" which take their source from the lack of accuracy of the forecast achieved by the controller, and information of this latter that these problem have, or have not any more, to be taken into consideration.

Taking account of the inaccuracy of the forecast achieved by the controllers, namely at the moment when the aircraft is entering in the sector and of the feeble value of the minimal separation to be insured at the crossing of their trajectories, the proportion of these "false conflicts" is important. Thanks to this function, the controllers will be relieved of the heavy task consisting either to non usefully watch permanently the evolution of numerous such "false conflicts", or to take an anticipated decision for proceeding with an escape manoeuvre thus penalizing the aircraft and his own task, despite that it would not have been necessary to do so.

The device according to the invention moreover provides the following functions.

It gathers, via the automatic data link with the onboard computers of the properly fitted aircraft, complementary data for refining the establishment of the "Computer's Agenda". Progressively as the aircraft are equipped with onboard computers and data links, the list of "false conflicts" will be enlarged according to the more accurate data, which will be automatically gathered. In particular, these data links will make possible to access to a better knowledge of the pilots intends, to the airspeed but also, thanks namely to GPS or other accurate navigation means, to the ground speeds, and to update the knowledge of the wind speed as it can be known thanks to the successive aircraft passages.

The assistance device according to the invention sends as necessary flight instructions to the onboard computers of the aircraft, via these same data links, for modifying when necessary the flight parameters of the aircraft. Nevertheless, according to uniqueness of responsibility in a given airspace, it cannot address such instructions without the preliminary agreement from the concerned controller.

It takes advantage of the very important case where this latter command uniqueness rule can be bypassed within the limit of the fuzziness of the controller's information, the said fuzziness resulting both from the large tolerance affecting the flight plans and from the imperfection of the forecast made by the controllers.

Within the limit of this imperfect controller's knowledge, nothing prevents the device from finely adjusting, without the knowledge of the controllers, the flight parameters of one or both concerned aircraft sufficiently in advance to insure their safe separation at their trajectories crossing. This device takes therefore advantage of the fuzziness of the controllers' vision. This possibility of subliminal action allows the invention device to increase more significantly the number of "false conflicts" of the "Controller's Agenda". Due to its subliminal nature for the controllers, this type of action can be made at any time, and namely if the conflict to be eradicated may only intervene in the airspace of a sector located downwards of the sector in which the aircraft is flying at a given instant.

Benefiting therefore of more time for benefiting from an even slight modification of the flight parameters, this so extended function contributes more to diminish the number of residual conflicts to be solved by the controllers.

Such a subliminal action towards the controller can be extended to the pilot. Indeed pilots generally rely on a computer (FMS) for conducting the flight i.e. an auto-pilot to which they make known their flight intentions (following the flight plan as introduced in the computer's memory, follow a landing trajectory or other . . . ). The auto-pilot follows itself the flight intentions and permanently corrects the aircraft attitude and trajectory according to the encountered atmospheric hazards.

To a certain extend, some of these parameters of the flight plan (airspeed, rate of climb or of descent . . . ) are chosen according to commercial reasons (compromise between speed and consumption for example), without any reason linked to safety.

With the device according to the invention, the flight plans, as filed for the air traffic control authorities by the pilot before takeoff, would include for each aircraft type a cruising speed and a rate of standard vertical evolution—this latter depending of the aircraft loading—as well as the margins within which these parameters can be modified by the pilot or by the controllers without any negative impact on the flight safety.

Within these limits, the pilot can freely choose the flight conditions; but also, within the same limits, the air traffic control system could select the modifications a priori acceptable to the pilot and therefore eventually executable by the auto-pilot without prior acceptance from the pilots. In these conditions, the commands, subliminal both to the controller and the pilot, constitute, for the aircraft auto-pilot, a simple constraint to which it has to react and which is of the same nature of the constraints resulting from aerologic hazards (winds, turbulences . . . ).

Within the above defined margins, the device according to the invention features what can be called an "air traffic control auto-pilot" able to automatically reduce the number of actual conflicts, while letting nevertheless both the pilot and the controller free to elaborate and modify, after mutual agreement, their intentions or their instructions relating to the concerned onboard or ground automatic devices.

The assistance device according to the invention also establishes the list of the conflicts which could occur in clusters, i.e. quasi-simultaneously at a future moment, and proposes in proper time to the controllers actions able to prevent said conflicts; these actions can be proposed at a moment when an aircraft is over-flying a sector upstream of the sector over which such conflicts would occur. The device according to the invention attracts the attention of the controller presently in charge of the concerned aircraft and specifically suggests him to accept the proposed solution even if said controller is not in a position for understanding the reason and the usefulness.

This device moreover insures the permanent survey of the evolution of the situation and warns the controllers of all non forecast event or of any error made by a controller or a pilot. The computer detects namely any aircraft behaviour not in accordance with the data it has in its memory and namely any behaviour resulting from a control instruction it has not been informed of.

For all the conflicts, which have not been eliminated by the previous functions, the computer displays in an appropriated format (analog or digital), on the display concerning the residual problems, the time left before the occurrence of the real conflict as well as the separation between the aircraft at the moment of their crossing.

The device according to the invention elaborates one or several solution(s) chosen among a set of standard manoeuvres: change of speed or of level, rate of vertical evolution, conventional radar conflict avoiding, direct routes, following by an aircraft a "dog's curve" spotting with the necessary margins a virtual aircraft shifted by the standard separation from the aircraft to be avoided.

When the aircraft are properly equipped, the assistance device according to the invention adds to this list of solutions the delegation, to aircraft being in conflict, of the mission to insure their safe separation by their proper means according to the conditions defined by said device. In this case, the conventional centralized control is step by step progressively decentralized.

Furthermore, the device according to the invention makes known to the concerned controllers on their Agenda display, on a bi-univocal way with the concerned conflict for example by a specific icon, that it keeps at their disposal such constantly updated solutions.

The device according to the invention moreover receives, via the same display, the eventual request from the controllers for knowing the said solution(s) and, in this case, displays on this same screen a virtual keyboard for easing entry by the controllers of the chosen solution.

This virtual keyboard, adapted to each selected function and elaborated for each specific case, anticipates the probable intentions of the controller for allowing him to enter the intended message with a minimum number of designations among the displayed blocks of information.

The device according to the invention takes note of the chosen solution, that the controller on his side addresses by radiotelephony link to the concerned aircraft. Or, at the request of the controller, the computer addresses directly the corresponding instructions to the on board computers of the properly equipped aircraft and surveys their execution;

The device according to the invention updates on the Controllers' Agenda according to ergonomic chosen codes (colour or intensity of the displayed data, icons, lateral slipping of a data line . . . ), the state of all the problems (false conflict, eliminated conflict, conflict being delegated to the computer to be solved and eventually sub-delegated to the aircraft computers, conflicts still to be solved by the controllers . . . .

In addition to its initial function, the Controllers' Agenda is therefore becoming the "dashboard" of the state of the situation i.e. both an indicator of the conflicts still to solved, an indicator of the delegations given to the computer and a virtual keyboard adapted to each transaction for communicating with the computer.

In addition to the above described displays (radar, Agenda) the device according to the invention computes and displays a graph of all the moments of occurrence of all the not already solved conflicts on a time graduated axis, on which the controllers can add the moments when they intend to verify the state of each problem for intervening if necessary according to the evolution of the situation.

In another version of the invention, the assistance device elaborates on a display an image showing each aircraft pair in potential conflict on the form of a point—and of its associated speed vector—the coordinates of which are respectively in abscises the time between the present time and the moment when the said aircraft will have their minimal longitudinal separation, and in ordinates the value of this separation at this moment.

To this point representing an aircraft pair is associated a label giving the necessary information concerning the said two aircraft and an indication giving their vertical separation at the moment when their horizontal separation will be minimal.

All these displays are coupled so that any designation of a problem by a controller on one of them makes the concerned aircraft appearing on all of them.

The assistance device according to the invention provides a complementary safety in case of any incident affecting the centralized system, by increasing the sub-delegations to the on board computers, as soon as the aircraft are equipped and eases a soft transition towards a more and more automated system.

In the more advanced stages of automation, the remaining problems left to be solved will be less and less numerous, so that the computer will be able to propose to the controllers an optimal strategy for insuring their solution, and to offer to take in charge its execution, with the agreement of the controllers.

The above analysis of one of the modes of functioning of the device according to the invention shows that this latter allows effectively surmounting the difficulties which, in the present state of the art, are opposing any significant progress of the present system. It shows particularly that this device allows to reach all the required objectives of uniqueness of responsibility, of friendliness, of efficiency and of progressive evolution of the system which has been assigned.

BRIEF DESCRIPTION OF THE DRAWINGS

More advantages and characteristics of the invention will appear when examining the detailed non limitative description of one of the modes of implementation and the attached drawings on which.

DETAILED DESCRIPTION OF THE PREFERRED EMBODIMENT

Figure 1:
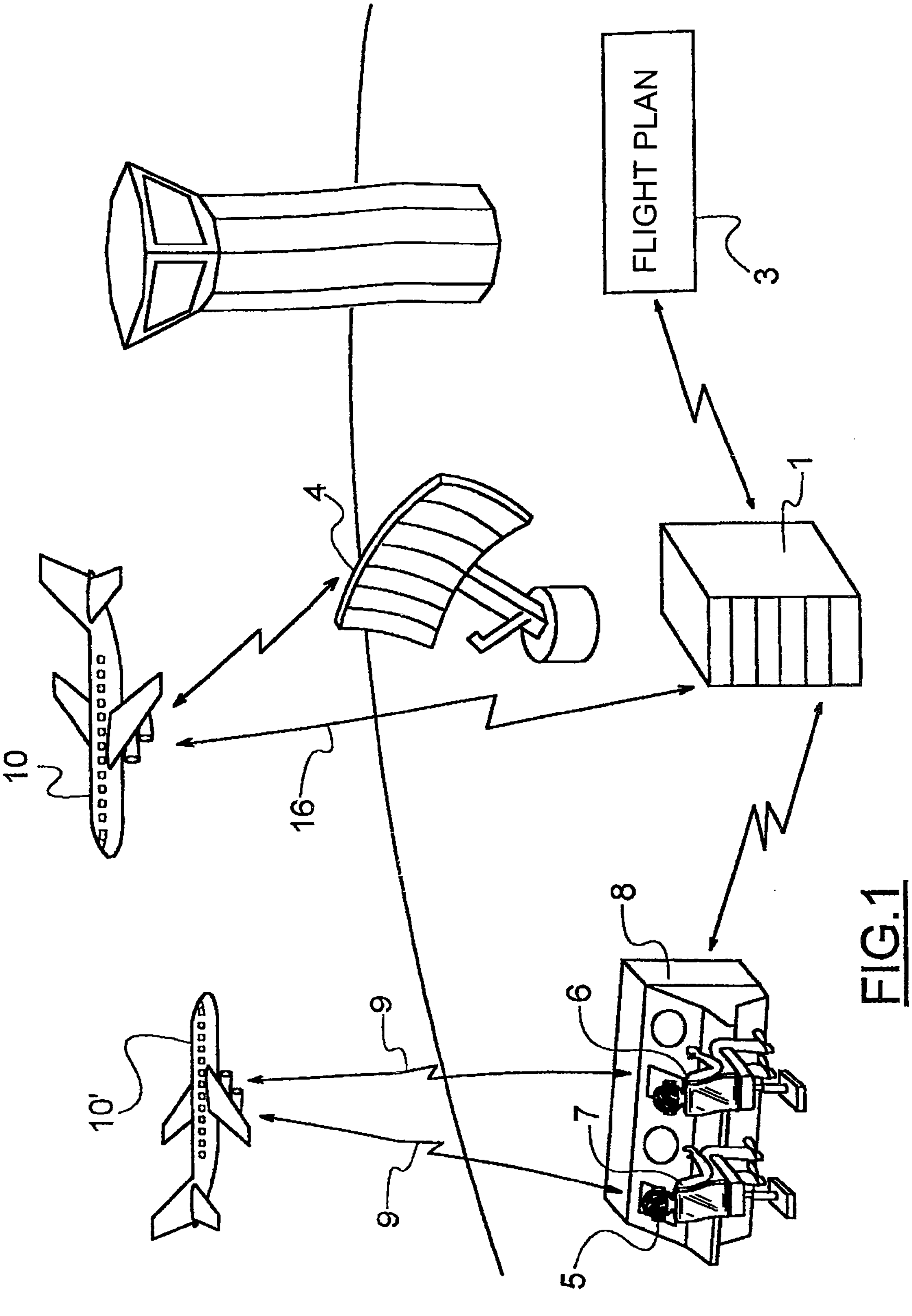
FIG. 1 shows the essential elements of the assistance device according to the invention in their environment.

First, it will be described in reference to the above-mentioned figures, an example of realization of the assistance device according to the invention. This device is complementing a presently classical air traffic control system which is composed of a computer 1 comprising software modules 2 for permitting:

- to receive data concerning the flight plans of the aircraft 3, as they have been deposited by the pilots before the flight and data provided by the radars 4,
- to interpret, to correlate and to elaborate these data for displaying on the screens 5 of the controllers 6 and assistant controllers 7 of each control sector who are having a radiotelephony link for communicating with the aircraft 10, 10'.

The complementary device comprises an additional software module 11 assisting the controllers for helping them to establish and display on a supplementary screen 12, a time ordered list of the problems 13, called the Controllers' Agenda, as these controllers are able to establish them with the sole data and analysing means at their disposal. This complementary device moreover comprises a software module and a complementary screen 14 for the management of the coordination between the sectors.

Figure 2:
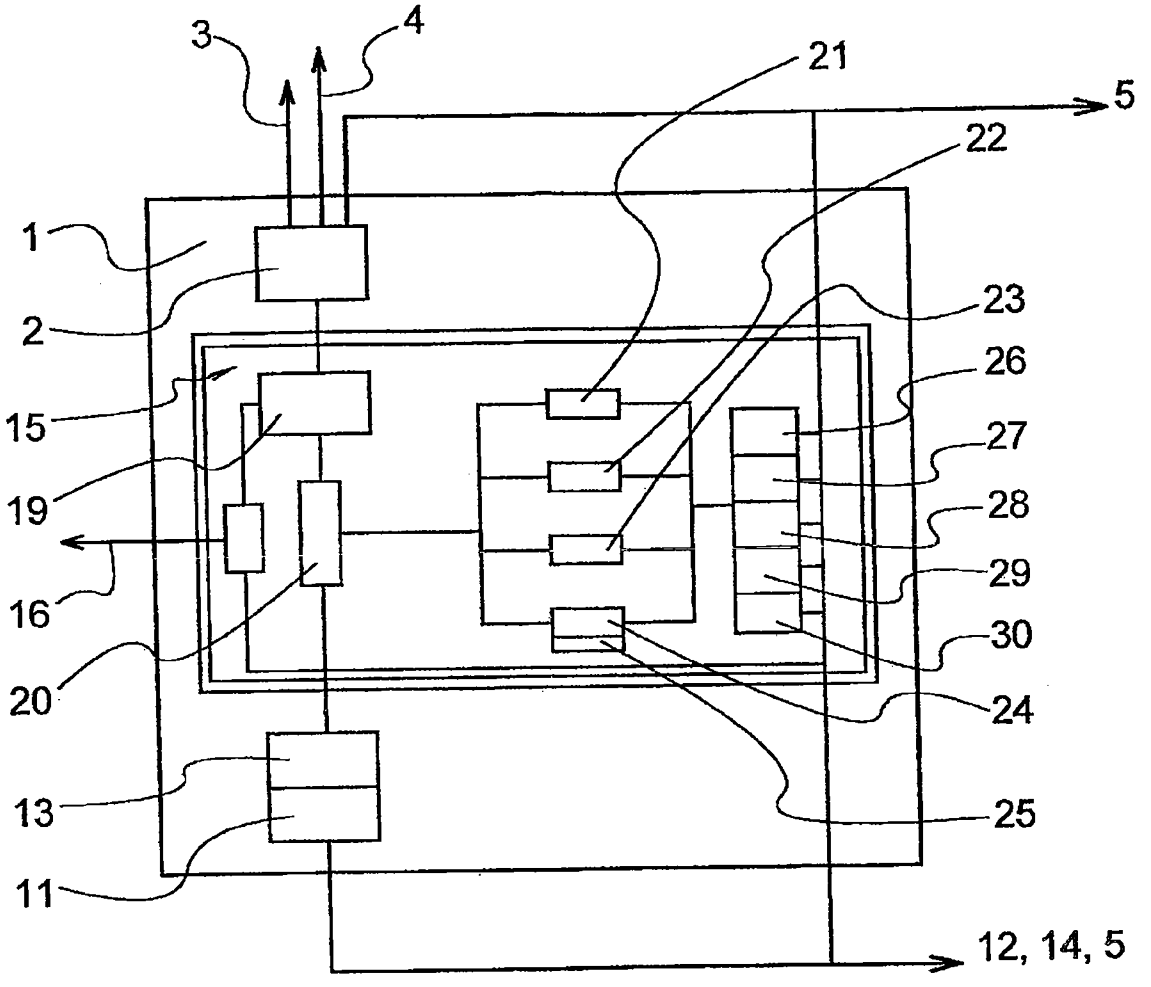
FIG. 2 represents an example of realization of the assistance device according to the invention.
Figure 5:
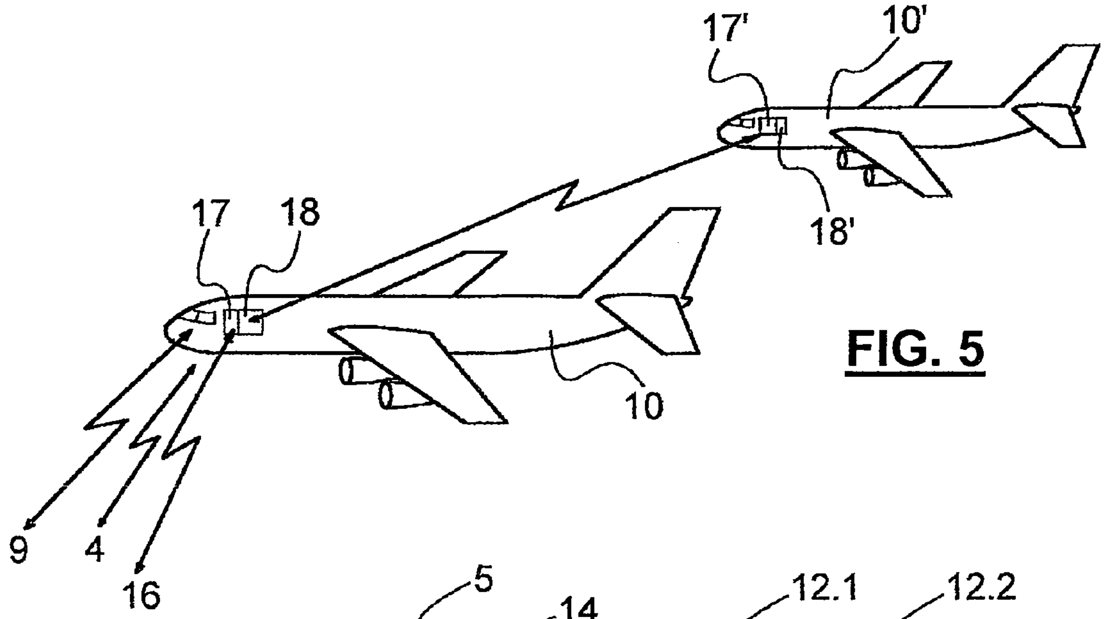
FIG. 5 shows the equipment of the aircraft and their links with the exterior, in one of the application of the assistance device according to the invention.

The device 15 according to the invention comprises, in reference to FIG. 2:

- a data link 16 between the computer and the on board computer 17 of the so equipped aircraft, for gathering the flight data and for sending the control instructions,
- a software module 18,18' installed in the on board computers 17,17' of the aircraft 10, 10' for allowing them to insure two by two the preventing their collision,
- a software module 19 permitting, on the basis of all the information and computational means of the computer, to compare the forecast aircraft trajectories to detect all the potential conflicts in order to establish and update a list, called the "Computer's Agenda", of the said conflicts, the said list including all the conflicts even before the implied aircraft has entered in the control sector where such a conflict could occur.
- a software module 20 permitting to compare, aircraft pair by aircraft pair, the "Controllers' Agenda" and the "Computer's Agenda" and to detect all the disparities between them,
- a software module 21 permitting to establish, among the problems of the Controllers' Agenda, the list of problems which take their source only to the lack of accuracy of the forecast made by the controllers and that has not to be taken into consideration,
- a software module 22 for selecting, among the aircraft pairs of the list 20 those of the conflicts which could be solved by a modification of the flight parameters (speed, rate of climb or of descent, beginning of the descent, lateral shift of the nominal route . . . ) of one or both concerned aircraft, the said modification staying within the limits of the normal tolerances of the flight plan, and for elaborating these modifications and transmitting the corresponding instructions via the data link 16,
- a software module 23 permitting to select among the conflicts of the list 20 of those of the conflicts which might occur quasi-simultaneously (clusters) in one of the sectors,
- a software module 24 permitting to elaborate and update the optimal solutions to each of the conflicts figuring in the "Computer's Agenda" 19 and more particularly to the conflicts clusters 23,
- a pre-establish list 25 of standardized types of conflict solutions (climbing or descending profiles, radar avoidance, direct route, control delegation to the aircraft . . . ),
- a software module 26 permitting to exchange messages between the computer and the controllers 6 and assistant controllers 7 by the touch display of the screen 5, 12, 14
- a software module 27 for elaborating and displaying, when and as necessary, on the Controllers' Agenda, the different function types specific to the device according to the invention offered by the computer to the controllers and concerning each of the conflicts, the said function types being associated in a bi-univocal manner to the line concerning this conflict on the form of icons 28, of colours, of symbols or of lateral shifting of blocks of data,
- a software module 29 for permitting to interpreter the designation by the controllers of such or such data block as displayed on the screen by the computer
- a software module 30 permitting to make appearing on the Controllers' Agenda 12 a keyboard 31 adapted to the type of message that the controllers are expected to wish to address to the computer after the designation by the controller of one of the types of functions 25.

It must be recalled that the keyboard 31 is of virtual nature and can be reconfigured according to the function to be performed.

So completed by the device according to the invention, the air traffic control system is able to benefit of all the available data, namely the ones it can acquire by the data links 16 with the aircraft which are so equipped.

The device according to the invention is able to offer at any time to the controllers a large set of services fitting the circumstances and their desires, without requiring from their part heavy attention or manoeuvres interfering with their free thinking stream and with the organization of their tasks.

Figure 3:
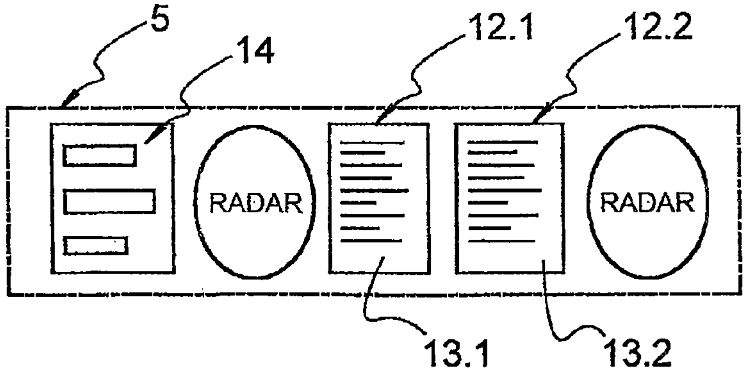
FIG. 3 schematically represents an example of displays for one control position as implemented in the device according to the invention.
Figure 4:
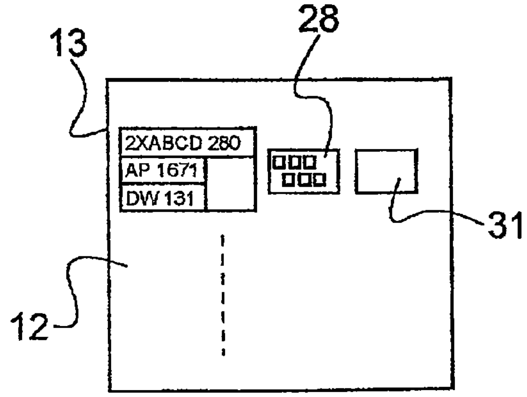
FIG. 4 shows a scheme of the data display on the Controllers' Agenda screen.
Figure 6:
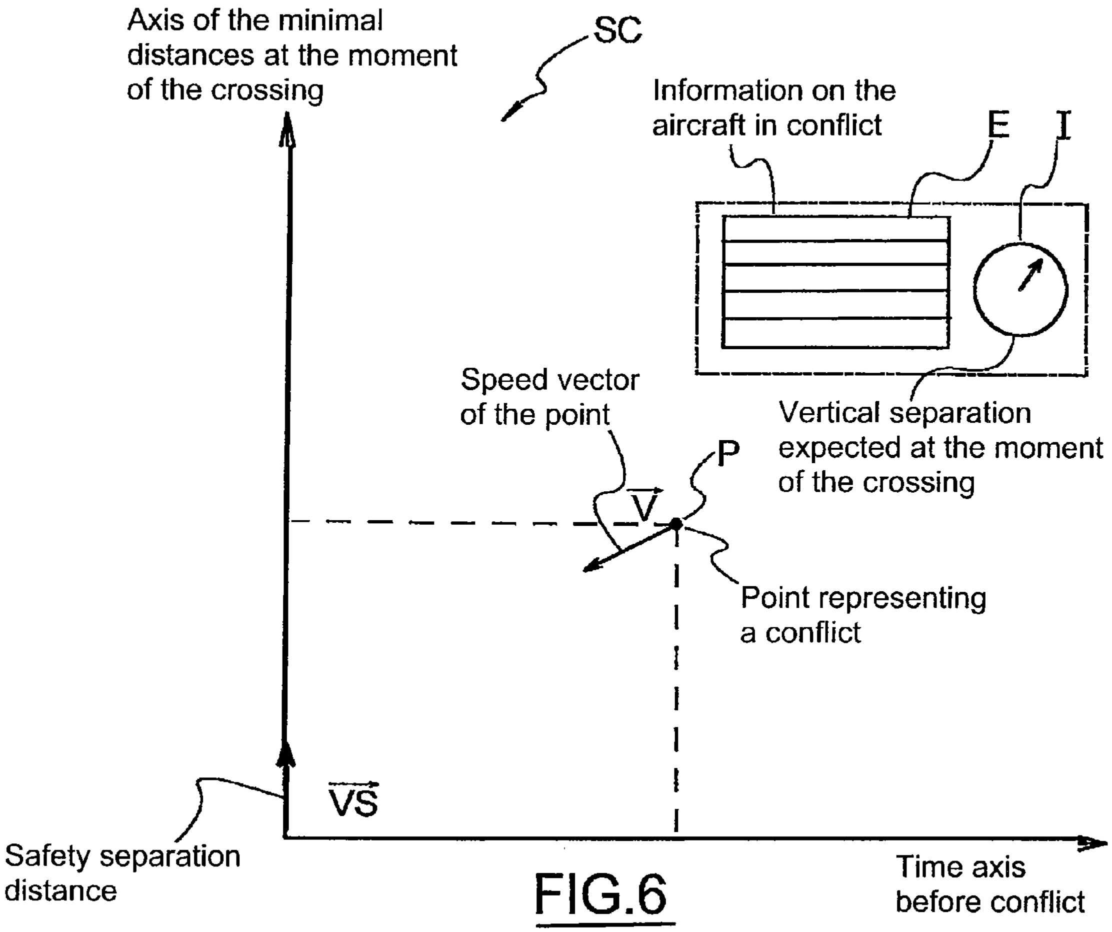
FIG. 6 is an illustration of a second version for realizing the assistance device according to the invention, in which is generated on a screen a display making appearing each aircraft pair in potential conflict, on the form of a point the coordinates of which being respectively in abscises the time separating the present moment from the moment when these aircraft will have their minimum longitudinal separation and in ordinates their separation at the said moment.

Among these services are namely figuring, in reference to the above quoted figures, and namely FIG. 3:

the display on the screens 12.1, 12.2, in relation with the concerned problem, of a characteristic signal making known according to the lists 13.1 and 13.2 established by the software modules 21 and 22, that this problem has no more to be taken in consideration by the controllers, followed by the designation by the controllers of the said signal, making therefore known to the computer that it has taken it in consideration, delegating accordingly to the device the responsibility to survey the evolution of the situation and to take any necessary measures;

the automatic transmission, without any prior coordination with the controllers, by the data link 16 to the aircraft of an instruction, staying within the normal tolerances of the flight plan, of modifying the flight parameters, followed by the display as here above described that the conflict is solved;

the display on the screens 12.1, 12.2, in relation with the concerned problem, of a characteristic signal making known that the computer keeps at the disposal of the controllers different types of standard solutions chosen among the list 25 and elaborated by the software module 25. Among the provided services, if the aircraft are equipped with a data link 16, the possibility is offered to the controllers to delegate their responsibility to the computer for addressing itself the instructions to the aircraft according to the solution chosen by the controllers and for surveying its execution. If the aircraft are not equipped by the data link 16, the controllers can make themselves acquainted with the said solution and send their instructions to the aircraft via the radiotelephony link 9 and confirm to the computer, by designating the said solution, the decision they have taken. The controllers can themselves, if they wish so, choose a type of solution by designating the characteristic signal and thus making appearing a keyboard 31 adapted to the designated type of solution permitting to easily express their intentions, according to their choice, for having them executed by the computer or for executing them by themselves as here above indicated;

the display on the screens 14 of the assistant controllers 7 of the sector in which the aircraft is presently flying, of a message, according to the list established by the software module 23, suggesting to modify the flight parameters when they are greater than the standard tolerance of the flight plan, in order to avoid the formation of clusters, followed by the eventual approval from the said assistant and by the transmitting by himself of the messages as suggested by the computer, or by an automatic data link message if the aircraft are so equipped;

As shown in FIG. 6, it is possible in another version of the device according to the invention, to provide on a screen SC the display of a point P representing a conflict between two aircraft, the coordinates of which are respectively in abscises the time separating the present moment and the moment when the two aircraft will have their minimal longitudinal separation and in ordinates their distance at the said moment. To this point P is associated a speed vector; a vector VS representing the safety separation is displayed on the vertical axis of the safety distances.

This display includes a label giving the necessary indications and information concerning the said two aircraft as well as their vertical separation at the moment of their minimum horizontal separation.

The controllers thus have at their disposal a dynamic vision of the situation and of its evolution and more particularly the moving vector of the displacement of the point representing each conflict, permitting to estimate in which measure it is moving toward the forbidden zone of safety separation represented by the vector VS on the vertical axis starting from and equal to the safety minimum separation.

Obviously, the invention is not limited to the above described examples here above described and numerous arrangements can be brought to these examples without coming out the scope of the invention.

The invention claimed is:

1. A device for automated evolutionary assistance to air traffic controllers including a computer having a software program permitting the receipt of data for equipping an air traffic control system including flight plans of aircraft and Radars and elaborating and displaying them to air traffic controllers, the air traffic controllers having a radiotelephony link for communicating with the aircraft, the device comprising:

a software module for establishing and updating a computer agenda, which is a list of the aircrafts' potential conflicts on the basis of any information and computation means of the computer;

said software module configured for selecting, among said computer agenda, potential conflicts on crossing trajectories which are solvable by modification(s) of aircraft speed, climbing or descending rates and lateral shift of route, said modification(s) being so minor as to not interfere with the air traffic controllers' decision making processes; and a data link between said computer and an on-board computer of the aircraft, the data-link being used for automatically:

(i) collecting complementary data from said on-board computer of the aircraft, said complementary data including flight data for establishing said computer agenda, and (ii) transmitting said minor modification(s) of flight parameters to said on-board computer for execution by the aircraft without requiring the air traffic controllers' prior agreement.

2. The device according to claim 1, wherein said software module is further configured for elaborating optimal solutions to residual potential conflicts which would interfere with the controllers' decision making processes.

3. The device according to claim 1, wherein said software module is configured for determining in real time among said potential conflicts within said computer agenda those which are false conflicts and displaying the false conflicts on a display of a sector in charge of the aircraft.

4. The device according to claim 1, wherein said software module is configured for updating potential conflicts into said computer agenda even before the aircraft have entered in a control sector with a potential conflict.

5. The device according to claim 1, wherein said software module is configured for selecting in said computer agenda particularly sensitive conflicts that lead to the occurrence of conflict clusters that are difficult to solve.

6. The device according to claim 5, wherein said software module is configured for proposing solution(s) for avoiding such occurrence on a display screen of the air traffic controllers presently in charge of the aircraft when said conflicts only occur in a following sector.

7. The device according to claim 5, wherein said software module is configured for proposing transfer conditions of an aircraft to a following sector to the air traffic controllers.

8. The device according to claim 1, further including a display device for displaying to air traffic controllers' icons in bi-univocal relationship with aircraft pairs on said computer agenda, said icons serving as a virtual keyboard for addressing in return specific messages to the computer concerning said aircraft pairs.

9. The device according to claim 8, wherein said display device is configured for displaying the aircraft pairs of said computer agenda, and a specific icon that makes displaying the virtual keyboard specifically adapted to the situation when designated by the air traffic controllers.

10. The device according to claim 2 further including a display device for displaying on said computer agenda an icon that indicates the air traffic controllers' desire to know the solution(s) elaborated by the computer and means for informing said computer of the chosen solution when designated by the air traffic controllers.

11. The device according to claim 10, wherein said computer is configured for automatically transferring the chosen solution to concerned aircraft for execution.

12. The device according to claim 1, further including a display device for displaying each aircraft pair in potential conflict as a point and its speed vector, the coordinates of said point being respectively the delay between a present moment and a moment when said aircraft pair will have a minimum longitudinal separation, and the separation distance at the present moment.

13. The device according claim 12, wherein said computer module is further configured for associating a label providing any necessary data concerning the aircraft with the point representing the aircraft pair.

14. The device according to claim 12, wherein said computer module is further configured for associating an indicator giving a vertical separation distance when their horizontal separation distance is minimum with the point representing the aircraft pair.

15. The device according to claim 12, wherein a designation by a controller of an aircraft on any display screen makes the aircraft and an aircraft conflicting with it appear on other display screens.

16. The device according to claim 11 wherein said computer module is configured for receiving data confirming the proper execution of instructions from said aircraft.

17. The device according to claim 16, wherein said computer module is configured for sending a message to two conflicting aircraft for sub-delegating to the conflicting aircraft the responsibility of insuring their safe separation by their own means according to clearances chosen among a set of possible conflict resolution manoeuvres.

18. The device according to claim 17, wherein said computer module is configured for insuring automatic display of the delegated conflict, so that said computer agenda provides a permanent monitoring board displaying a list of the delegated conflicts and a list of potential conflicts still to be solved.

19. A method for automated evolutionary assistance to air traffic controllers including a computer having a software program permitting the receipt of data for equipping an air traffic control system including flight plans of aircraft and radars and elaborating and displaying them to air traffic controllers, the air traffic controllers having a radiotelephony link for communicating with the aircraft, the method comprising:

establishing and updating a computer agenda, which is a list of the aircrafts' potential conflicts on the basis of any information and computation means of the computer;

selecting potential conflicts on crossing trajectories which are solvable by modification(s) of aircraft speed, climbing or descending rates, and lateral shift of route, said modification(s) being so minor as to not interfere with the air traffic controllers' decision making processes;

establishing a data link between said computer and an on-board computer of the aircraft, the data-link being used for automatically:

(i) collecting complementary data from said on-board computer of the aircraft, said complementary data including flight data for establishing said computer agenda, and (ii) transmitting said minor modification(s) of flight parameters to said on-board computer for execution by the aircraft without requiring the air traffic controllers' prior agreement.

* * * * *